June 10, 1947.     W. SEAMAN     2,421,854
TEMPERATURE COMPENSATOR FOR REFRACTOMETERS
Filed Sept. 28, 1944     2 Sheets-Sheet 1

Fig. 1.

INVENTOR
WILLIAM SEAMAN,
BY
Robert Ames Norton
ATTORNEY

June 10, 1947.          W. SEAMAN                2,421,854
TEMPERATURE COMPENSATOR FOR REFRACTOMETERS
Filed Sept. 28, 1944        2 Sheets—Sheet 2
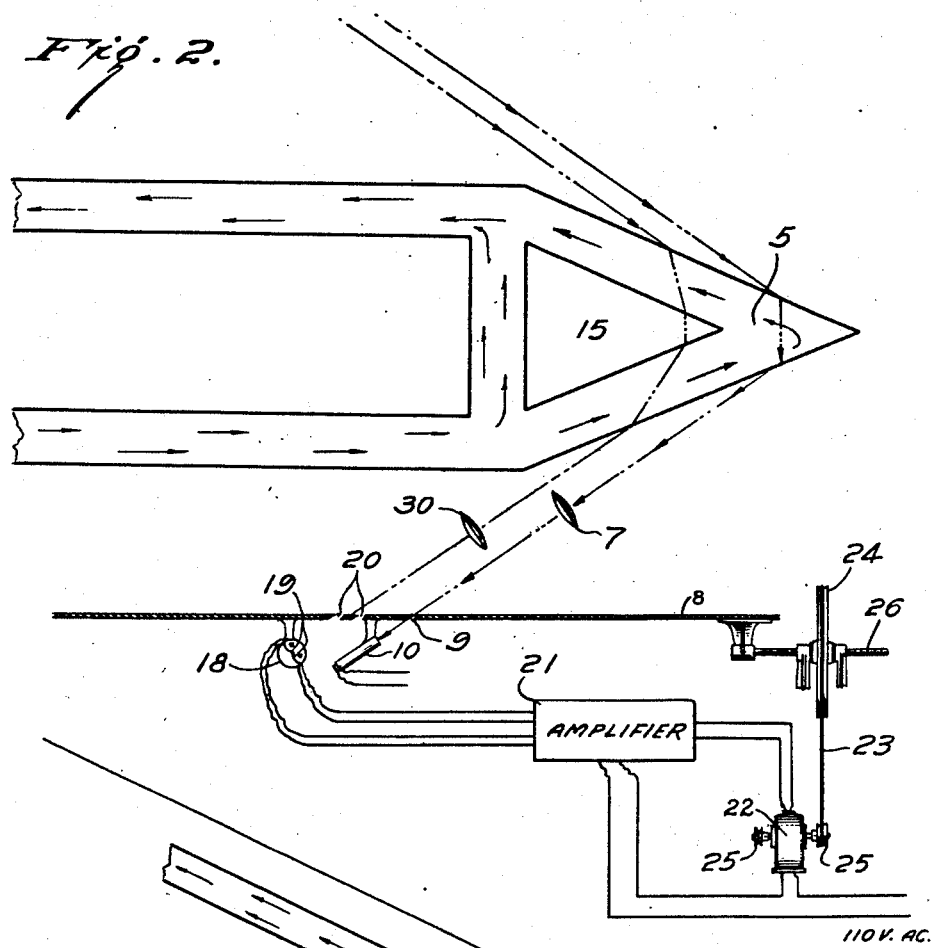
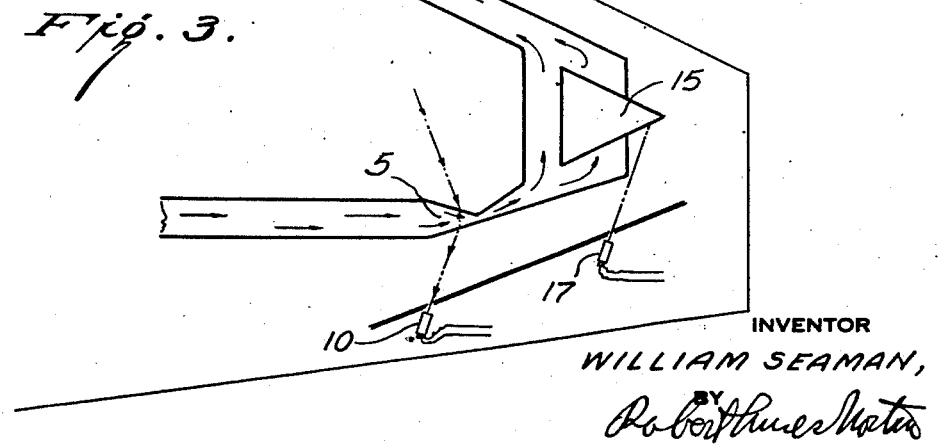
INVENTOR
WILLIAM SEAMAN,
ATTORNEY Patented June 10, 1947

2,421,854

UNITED STATES PATENT OFFICE 2,421,854

TEMPERATURE COMPENSATOR FOR REFRACTOMETERS

William Seaman, New York, N. Y., assignor to American Cyanamid Company, New York, N. Y., a corporation of Maine Application September 28, 1944, Serial No. 556,270

4 Claims. (Cl. 250—41.5)

This invention relates to an improved apparatus for continuously analyzing a fluid stream for a plurality of components of varying refractive indices, and more particularly to an apparatus for transforming changes in refractive index of the fluid stream into electrical currents.

There are many reactions in which a fluid mixture is involved, the composition of which is to be carefully measured and if desired controlled. Examples of such mixtures are solutions of dicyandiamide in liquid ammonia for use in the production of melamine, reaction mixtures for producing acrylonitrile by the interaction of hydrocyanic acid and ethylene oxide and the like. In such reactions it is important to know at all times the chemical constitution of the mixture or at least the concentration of one or more components therein and it is desirable in many cases to effect automatic control which will keep the composition of the reaction mixture within certain predetermined limits. The present invention is applicable to all processes in which a fluid reaction mixture changes its refractive index with changes in composition.

A proposal has been made in the past to effect a control or measurement by passing a sample of a multicomponent fluid through a hollow prism, passing light therethrough and causing the spectrum produced to pass through a wide slot onto a photocell. Changes in refractive index result in a shift of the spectrum produced and when the spectrum is normally located either missing the slot or covering substantially all of the slot, a movement of the spectrum will result in a greater or smaller proportion thereof being cut off so that the amount of radiant energy striking the photocell will vary and it has been proposed to utilize suitable relay circuits to be actuated by these variations in photocell current. The arrangement proposed was open to many serious practical disadvantages. The change of photocell current with change of refractive index was relatively slow because until the spectrum had been moved a considerable distance so that a fairly large proportion of the light no longer struck the photocell there was not sufficient difference in photocell current to effect reliable control. An even more serious disadvantage lay in the fact that measurement and control depended entirely on differences in photocell current and these differences depended not only on the change of refractive index of the fluid being measured but also on the intensity of light emitted by the light source and the color transmission of the fluid medium. Any factors affecting either of these characteristics would be treated by the photocell as changes in radiant energy striking it and it would correspondingly behave in a similar manner as in the case of a shift of the spectrum due to change in refractive index. In other words, the device was not reliable for precise work and was apt to give false readings.

In the application of Robert Bowling Barnes, Serial No. 423,366, filed December 17, 1941, there is described a greatly improved device which is substantially unaffected by fluctuations in the light source and operates within wide limits regardless of the degree of transparency of the fluid passing through the prism of the control device. The Barnes apparatus provides a narrow band of monochromatic light from a slit interposed in front of a source of illumination followed by a filter, if the illumination is from a continuous emitter, or preferably utilizing a source which produces a spectrum containing one or more narrow luminous bands or lines, for example, a high pressure mercury arc. This narrow band or line of light, after passing through the control prism through which the liquid flows, is imaged on a slit or on a plane containing a knife edge which defines one side of a slit. Any change in refractive index moves the image of the narrow luminous line and a very accurate on and off control is obtained by placing a photocell behind the slit. So sharp and sensitive is the device that in a commercial installation a shift of the light of a millimeter or less results in a relatively enormous change in photocell current, the change being that between dark cell current and full illumination. Currents from the photocell of the Barnes refractometer may be amplified by known means, such as for example, a mirror galvanometer with a bright light source and suitably positioned photocells or other known means for transforming the current into an indication or actuation of a control device.

In spite of the enormous improvement which is represented by the Barnes device and which for the first time makes completely reliable control through refractive index changes a commercial reality, there still remains one problem. In the Barnes instrument temperature changes the refractive index of the fluid flowing through a hollow prism. Unfortunately fluids change their refractive index quite materially with temperature and in commercial installations where the fluid is a small sample taken from a large apparatus in which a process is going on, temperature change may be unavoidable and false indication may result due to change of refractive index with temperature unless care is taken to assure a constant temperature of the fluid. While it is possible to obtain such temperature regulation the thermostatic means necessary are cumbersome and delicate and are frequently unsuitable for installations in commercial plants. It is, therefore, customary to adjust the Barnes refractometer when changes of temperature take place. This requires skilled supervision.

The present invention is an improvement on the Barnes device which provides for temperature compensation either manually or automatically. Essentially the invention depends on the use of two beams of light, one of which is deviated in a hollow prism by the fluid to be measured. The other passes through a prism immersed in the liquid to be measured and at the same temperature. This prism changes its refractive index with temperature at substantially the same rate as the liquid to be analyzed. This second prism may advantageously be hollow and contain a sample of the liquid to be analyzed of predetermined composition.

Both beams are deviated and can be caused to strike on a plate having a plurality of slits at predetermined and preferably adjustable intervals. If the device is set so that at a particular temperature the beams just strike the slits or just miss them, any change in refractive index which will result in a change in refractive index will move both beams proportionally, and if the slits are then moved either automatically or manually, the measuring beam will always give an accurate measurement or control regardless of changes in temperature of the fluid through which it passes within a very wide range which covers any practical operation.

Where constant fluctuations in temperature are not encountered and it is only necessary to check the instrument occasionally, the second beam may operate any suitable indicating or alarm device and manual adjustments can then be made. This eliminates continuous supervision and assures at all times that the instrument is operating accurately. Where, however, fluctuations in temperature of the liquid are apt to be frequent, or where the instrument is so located as to make manual adjustment difficult, or both, a modification of the present invention may be used in which the second beam is used to automatically move the slit for the measuring or controlling beam so that the latter is automatically and continuously maintained in its proper position with respect to the measuring slit.

It will be apparent that the present instrument is capable of assuring that the measurement is always the result of composition changes in the liquid without regard to changes in temperature. Because temperature changes may be compensated for it is possible to locate the instrument at some distance from the equipment in which the liquid to be analyzed or controlled is being produced or processed. This is an advantage because frequently the conditions immediately adjacent to the operating equipment may be unsuitable for precise measuring instruments. The instruments of the present invention may be located on a central control board and temperature differences which may result from rather long connecting lines are compensated for. This is an advantage because the operator who is normally near such a control board can manually compensate the instrument without prejudice to his other duties.

A number of modifications of the present invention are possible and will be illustrated in the drawings, in which:

Fig. 1 is a diagrammatic representation of a modification of the present instrument embodying manual compensation;

Fig. 2 is a diagram of a similar instrument employing automatic compensation; and Fig. 3 is a diagram of a modified design of apparatus.

The instrument shown in Fig. 1 consists of a source of light 1 in a housing provided with a suitable adjustable slit 2, from which a beam emerges. The beam is collimated by lens 4 and may pass through a filter 3 if it is desired to suppress certain portions of the light. The beam then passes through a hollow prism 5 through which the liquid to be analyzed or controlled flows, and slit 2 is imaged by the lens 7 onto the plane of a plate 8. This plate is provided with a threaded extension 26 and an adjusting nut 27. The plate 8 is in two portions, one which is relatively movable and which can be moved and clamped in position by the clamp 29. The stationary portion of the plate 8 carries a slit 9, while the movable portion 28 carries a slit 16. Photoelectric devices 10 and 17 are mounted on the plate behind the slits 9 and 16 respectively.

A second beam from a similar source of light (not shown) passes through a prism 15 which is immersed in the liquid to be measured and which is composed of material whose refractive index changes with temperature at the same rate as the liquid to be measured. The source of the second beam passing through this prism is imaged by the lens 30 onto the plane of the plate 8 near the slit 16.

The output from the photoelectric device 17 goes to any indicating or alarm device of conventional design (not shown). The output from the photoelectric element 10 goes to a mirror galvanometer 11 provided with mirror 13 on which an intense beam of light from source 12 strikes. Movement of the mirror causes the reflected beam to strike or miss a photocell 14. The galvanometer and light beam therefore operate as a very sensitive optical relay and the output from the photocell 14 may be led to conventional control devices for modifying the composition of the liquid or controlling the reaction by which it is produced.

In operation a particular band of light is chosen and for practical purposes it is preferable to use light sources which emit sharp bands, such as high pressure mercury arcs. If it is desired to use the green line of mercury, which is the most practical one, plate 8 is moved so that the beam passing through the prism 5 just misses the slit 9. The movable portion 28 is moved so that the slit 16 will be positioned so that the same line of the beam passing through prism 15 will just hit it. The clamp 29 is then tightened and the device is ready for operation. As long as the temperature remains the same the instrument will operate by reason of changes in the composition of the liquid, the movement of the beam from the prism 5 actuating the control device through the photoelectric element 10 and the optical relay described above. If the temperature changes, which would move both beams, light will no longer strike the photoelectric element 17 and an indication or alarm will be given. The operator then turns the adjusting nut 27 until the beam through the prism 15 again strikes the slit 16.

Fig. 2, in which the same elements bear the same reference numerals, shows a slightly different location of the prism 15, closely adjacent to the measuring prism 5, so that the two beams may come from the same source (not shown). The plate 8 is provided with the measuring slit 9 and is also provided with two slits 20 separated by a narrow opaque strip. Behind these two slits is mounted a phototube 18 provided with two cathodes 19. The device is adjusted so that the line of light used which passes through the prism 15 just strikes the strip between the two slits 20. In this position neither cathode of the phototube 18 is illuminated. Any change in temperature will result in a movement of the beam passing through the prism 15. Movement in one direction will energize one cathode of the phototube and in the other direction will energize the other. The outputs of the phototube go into the input circuit of an amplifier 21 the output of which drives a motor 22, the direction of rotation depending on the phase of the output, which in turn is controlled by which cathode of the phototube 18 is illuminated. The motor 22 drives through a pulley 25 and a cable 23 an adjusting nut 24 on a threaded shaft 26 connected to the plate 8. The motor is so phased that its rotation moves the plate 8 in a direction to bring the beam through the prism 15 back on the opaque strip between the slits 20 and the motor, of course, continues to rotate until the beam no longer passes through one of the slits, at which time neither cathode of the phototube 18 is illuminated and the motor stops.

The device of Fig. 2 has the advantage that the instrument is automatically compensated and it is also possible to combine compensation with indication or recording of temperature fluctuations. For this purpose the motor 22 may be provided with a second pulley 25 from which a drive to a continuous recording or indicating device may be taken off. The amount of rotation of the motor is, of course, a measure of the temperature change.

The arrangement of the compensating prism 15 in Fig. 2 presents both advantages and disadvantages. It is closer to the portion of the prism 5 through which the measuring beam passes. This makes the temperature in the two prisms more nearly the same. However, the two beams are rather close together and it is sometimes simpler optically to have a separate light source and the compensating prism 15 located further away, as in Fig. 1. Of course the automatic feature does not depend in any way on the location of the control prism 15 and may be applied to a device in which the prism is located quite a distance from the measuring prism 5, as shown in Fig. 1.

Fig. 3 shows a slightly modified device, the diagrammatic illustration showing merely the two prisms and the two beams. In this modification the compensating prism 15 extends beyond the liquid to be measured. This has the advantage that the compensating beam does not pass through the liquid to be measured at all and no change in deviation results because of changes in composition. On the other hand, the prism 15 is not completely surrounded by liquid and its response to changes in temperature is not quite as rapid. The device of Fig. 3 permits obtaining high accuracy of control and is particularly suitable where the temperature conditions in the liquid to be measured are not greatly different from the atmosphere surrounding the exposed end of the prism 15. Under such conditions the arrangement is very desirable. Where, however, there are considerable fluctuations in temperature outside of the moving stream of liquid, arrangements such as are shown in Figs. 1 and 2 are preferable.

It is an advantage of the invention that it is quite flexible and various physical arrangements may be used to suit the particular conditions arising in specific problems. The various modifications of the instrument have been illustrated diagrammatically and in practice the instrument is mounted in a suitable housing or box.

The present invention is concerned with the instrument itself and not with processes in which it may be used. Typical problems are the control of the concentration of dicyandiamide and ammonia in processes for producing melamine, maintenance of constant reaction mixtures in the production of acrylonitrile by the interaction of hydrocyanic acid and ethylene oxide, etc. The instrument can be used for measuring or controlling any multicomponent liquid mixtures.

In the drawings the measuring beam from the prism 5 is shown as imaged on a plate containing a slit. When the beam is normally imaged so that it just misses the slit the width of the slit is immaterial because the actuation of the galvanometer really results from the beam moving from the plate to an opening where it strikes the photocell. Therefore, in simpler cases it is sufficient if there is only a single knife edge defining one side of a slit. The present invention includes both instruments in which there is only a single knife edge and those where a definite slit is present.

I claim:

1. A device for transforming changes of refractive index of a fluid into electrical currents which comprises, in combination, means for producing a narrow line or band of substantially monochromatic radiation, a hollow prism, means for passing a fluid therethrough, an opaque plate having an opening and at least one slit, a side of which opening is in the form of a straight edge, a photoelectric device behind said straight edge, means for causing the line or band the axis of which is parallel to the straight edge to pass through the prism and to be imaged on the plane of said plate adjacent the straight edge, a second prism in heat exchanging relation with the fluid and composed of material the refractive index of which changes the temperature at substantially the same rate as the fluid, means for passing a narrow band of radiation of substantially the same wave length as the first band through said prism the axis of the band being parallel to said slit, means for imaging said band on said slit, a photoelectric device behind said slit and rigidly connected to the members defining the slit, the members defining said slit being rigidly connected with said plate, and means for moving said plate and slit defining members as a unit in the direction of movement of the bands of radiation.

2. A device according to claim 1 in which the second beam is imaged on a narrow opaque strip between two slits and the photoelectric device is provided with two photoresponsive elements, one behind each slit, an amplifier for amplifying the output of said photoelectric device, a motor actuated by the output of the amplifier and capable of rotating in different directions, and drive means interconnecting the motor with the plate and slit defining members, the electrical connection between the amplifier and the motor being such that the motor turns in a direction to move the slit defining members to again image the second beam on the opaque strip.

3. A device according to claim 1 in which the means for producing the narrow line or band of monochromatic radiation comprises a high pressure mercury arc.

4. A device according to claim 1 in which the means for producing the narrow line or band of monochromatic radiation comprises a high pressure mercury arc and in which the second band is imaged on a narrow opaque strip between two slits and its photoelectric device is provided with two photoresponsive elements, one behind each slit, an amplifier for amplifying the output of said photoelectric device, a motor actuated by the output of the amplifier and capable of rotating in different directions, and drive means interconnecting the motor with the plate and slit defining members, the electrical connection between the amplifier and the motor being such that the motor turns in a direction to move the slit defining members to again image the second band on the opaque strip.

WILLIAM SEAMAN.